United States Patent [19]

Kumagai

[11] Patent Number: 4,817,385
[45] Date of Patent: Apr. 4, 1989

[54] TEMPERATURE CONTROL APPARATUS FOR VEHICULAR CATALYTIC CONVERTERS

[75] Inventor: Shiro Kumagai, Kyoto, Japan

[73] Assignee: Mitsubishi Jidosha Kogyo Kabushiki Kaisha, Tokyo, Japan

[21] Appl. No.: 72,220

[22] Filed: Jul. 10, 1987

[30] Foreign Application Priority Data

Jul. 16, 1986 [JP] Japan .............................. 61-10797[U]

[51] Int. Cl.⁴ ................................................. F01N 3/20
[52] U.S. Cl. ......................................... 60/288; 60/277; 422/115; 422/171
[58] Field of Search .................. 60/277, 288; 422/115, 422/171

[56] References Cited

U.S. PATENT DOCUMENTS

| | | | |
|---|---|---|---|
| 3,440,817 | 4/1969 | Saufferer | 60/288 |
| 3,785,151 | 1/1974 | Holl | 60/277 |
| 3,810,361 | 5/1974 | Weaving | 60/288 |
| 3,851,469 | 12/1974 | Eichler et al. | |
| 3,988,890 | 11/1976 | Abthoff | 60/288 |

FOREIGN PATENT DOCUMENTS 210116 12/1982 Japan .................................... 60/277

Primary Examiner—Douglas Hart
Attorney, Agent, or Firm—Frishauf, Holtz, Goodman & Woodward

[57] ABSTRACT

A temperature control apparatus for at least two catalytic converters which are connected in series in an exhaust passage of an internal combustion engine mounted on a vehicle. A by-pass is disposed in parallel with a first catalytic converter which is connected in the vicinity of the engine. Valve drive means serves to drive a control valve for controlling the ratio between the amounts of exhaust gas introduced into the first catalytic converter and the by-pass. Control means serves to calculate the deviation between a reference value and a temperature value, which is associated with the catalyst-bed temperature of the first catalytic converter, and is detected by temperature detecting means, and to deliver a drive signal to the valve drive means in accordance with the deviation, thereby controlling the opening of the control valve. Immediately after the start of the engine, therefore, the catalyst-bed temperature of the first catalytic converter rises to the reference temperature value for an optimum purifying efficiency. Thereafter, the bed temperature is kept constantly in the vicinity of the reference value.

9 Claims, 4 Drawing Sheets

TEMPERATURE CONTROL APPARATUS FOR VEHICULAR CATALYTIC CONVERTERS

BACKGROUND OF THE INVENTION

The present invention relates to a temperature control apparatus for vehicular catalytic converters, adapted to control the catalyst-bed temperature of the catalytic converters properly.

Exhaust gas from car engines contains noxious substances, such as CO, HC, NOx, etc., which will develop into air pollutants. Therefore, air pollution can be restrained by reducing production of these noxious substances or by purifying exhaust gas. To attain this, vehicles or cars are furnished with various means for reducing or purifying exhaust gas. Thus, the car engines are improved so that the production of the noxious substances are suppressed, and the exhaust gas from the engines is purified by removing the harmful substances therefrom by means of a catalytic converter. Conventional catalytic converters, used to purify the exhaust gas, include three-way catalytic converters, which serve to remove CO, HC, and NOx, and oxidizing catalytic converters which can remove CO and HC.

In general, a catalytic converter is mounted in an exhaust passage of an engine, and serves to purify exhaust gas of the engine discharged into the exhaust passage by removing the noxious substances from the gas. In this arrangement, the exhaust gas can be discharged into the atmosphere only after it is purified, thus making for the prevention of air pollution.

In view of warm-up performance, the catalytic converter should preferably be situated in a position near the engine where the temperature of the exhaust gas is high. For higher durability, on the other hand, it is advisable to locate the catalytic converter in a positions remote from the engine where the exhaust gas is at a relatively low temperature. With this arrangement, a rise of the converter temperature can be limited within an allowable range, so that the converter can be kept at a proper temperature. In other words, if it is situated close to the engine, the catalytic converter is liable to be heated. Although its warm-up performance is high, therefore, the converter tends to be heated to so high a temperature that it can be deteriorated quickly, and can therefore enjoy only a short life. If the converter is situated at a distance from the engine, on the other hand, its warm-up performance and hence purifying efficiency lower, although its life performance is improved.

Thus, the warm-up performance of the catalytic converter and the life performance or durability thereof are incompatible with each other.

In a temperature control apparatus disclosed in U.S. Pat. No. 3,851,469, a catalyst is prevented from being lowered in quality in the following manner. A catalytic converter is provided with a by-pass, which is adapted to open, thereby preventing exhaust gas from flowing into the converter, to restrain a rise of the catalyst temperature, when the temperature of the catalyst exceeds a set value. In this apparatus, all the exhaust gas is introduced into either the by-pass or the catalytic converter, in accordance with the catalyst temperature. Accordingly, it is difficult to keep the catalyst temperature constantly at a proper value. Thus, the required purifying efficiency cannot be obtained.

OBJECT AND SUMMARY OF THE INVENTION

The object of the present invention is to provide a temperature control apparatus for vehicular catalytic converters, in which the catalyst-bed temperature of each catalytic converter is controlled for a proper temperature, so that the converters can enjoy a shorter warm-up time and improved durability.

According to the present invention, there is provided a temperature control apparatus for at least two catalytic converters connected in series in an exhaust passage of an internal combustion engine mounted on a vehicle. A by-pass is disposed in parallel with a first catalytic converter which is connected in the vicinity of the engine, out of the two or more catalytic converters. A control valve is used to control the ratio between the amounts of exhaust gas introduced into the by-pass and the first catalytic converter, and valve drive means serves to drive the control valve. Temperature detecting means is used to detect a temperature associated with the catalyst-bed temperature of the first catalytic converter. Control means calculates the deviation between a reference value and the temperature value detected by the temperature detecting means, and delivers a drive signal to the valve drive means in accordance with the deviation, thereby controlling the opening of the control valve.

At the start of the engine or in some other case, the control valve is operated so that all the exhaust gas from the engine is introduced into the catalytic converters. Thus, the catalyst-bed temperature of the first catalytic converter, situated close to the engine, rises quickly, thereby shortening the warm-up time of the converter. When the temperature of the first catalytic converter rises up to a proper temperature (target temperature), the control means causes the valve drive means to control the opening position of the control valve, in accordance with the calculated deviation, thereby regulating the flow of the exhaust gas into the first catalytic converter. Thus, the catalyst-bed temperature of the converter is restrained from increasing, and is kept at the proper temperature. Meanwhile, the exhaust gas flowing through the by-pass is purified and discharged into the atmosphere by a second catalytic converter, which is connected to the lower-course side of the by-pass. The second converter is situated at a distance from the engine, and the temperature of the exhaust gas introduced thereinto is low. Accordingly, the catalyst-bed temperature of the second catalytic converter cannot rise to an extraordinary level. In consequence, the catalytic converters, arranged in the exhaust passage of the engine, can enjoy both satisfactory warm-up performance and high durability, thus providing improved exhaust purifying capability.

Preferably, the control means delivers a drive signal to the valve drive means when the temperature value, detected by the temperature detecting means, exceeds a predetermined allowable temperature value greater than the reference value, the drive signal serving to drive the control valve to an opening position such that the amount of exhaust gas introduced into the first catalytic converter is substantially zero. By doing this, the control means can lower the catalyst-bed temperature quickly.

Preferably, moreover, the control means is adapted to render the valve drive means nonoperating, thereby maintaining the opening of the control valve, when the absolute value of the deviation is not greater than a predetermined value. Thus, the control of the catalyst-bed temperature can be stabilized.

Three-way catalytic converters or oxidizing catalytic converters are preferably used as the aforesaid catalytic converters.

In a further preferred arrangement, a second by-pass is disposed in parallel with a second catalytic converter, which is located on the lower-course side of the first catalytic converter, and a second control valve is used to control the ratio between the amounts of exhaust gas introduced into the second by-pass and the second catalytic converter. The second control valve is driven by second valve drive means. The control means delivers a drive signal to the second valve drive means when a temperature value, which is associated with the catalyst-bed temperature of the second catalytic converter, and is detected by second temperature detecting means, exceeds a predetermined allowable temperature value of the second catalytic converter, the drive signal serving to drive the second control valve to an opening position thereof such that the amount of exhaust gas introduced into the second catalytic converter is substantially zero. Thus, the second catalytic converter can be improved in durability.

Furthermore, the control means may be designed so as to calculate the deviation between a reference value set for the second catalytic converter and the temperature value detected by the second temperature detecting means, and to deliver a drive signal to the second valve drive means in accordance with the deviation, thereby controlling the opening of the second control valve.

The above and other objects, features, and advantages of the present invention will be more apparent from the ensuing detailed description taken in connection with the accompanying drawings.

DETAILED DESCRIPTION

Figure 1:
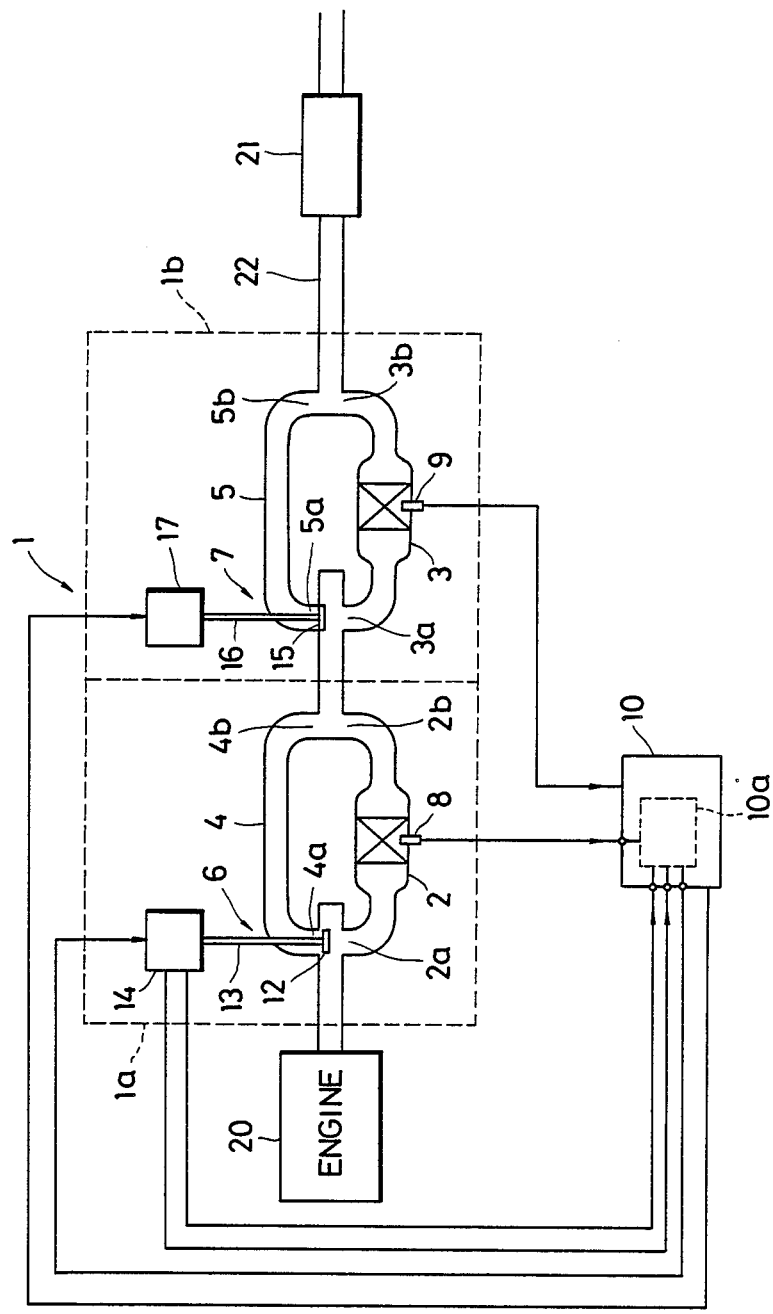
FIG. 1 is a diagram showing an embodiment of a according to the present invention.

FIG. 1 shows a temperature control apparatus for vehicular catalytic converters according to the present invention. In FIG. 1, the temperature control apparatus 1 comprises two systems 1a and 1b, which are composed, respectively, of catalytic converters 2 and 3, by-passes 4 and 5 shunting around their corresponding converters 2 and 3, control valve units 6 and 7 located at the junctions of the converters 2 and 3 and their corresponding by-passes, and temperature sensors 8 and 9 in the converters 2 and 3, respectively. The control valve units 6 and 7 are controlled by an electronic control unit (hereinafter referred to simply as an ECU) 10.

The catalytic converters 2 and 3 are connected in series in an exhaust passage 22 which extends between an engine 20 and a muffler 21. The one converter 2 is situated in a position close to the engine 20, e.g., at a distance of 50 cm therefrom, in order to improve the warm-up performance. For higher durability, on the other hand, the other converter 3 is situated farther from the engine 20, e.g., at a distance of 150 cm therefrom. Converters of various types may be used as the catalytic converters 2 and 3, including three-way catalytic converters, oxidizing catalytic converters, for example.

The by-pass 4 is disposed in parallel with the catalytic converter 2, and its upper- and lower-course ends 4a and 4b are connected to upper- and lower-course ends 2a and 2b of the converter 2, respectively. Likewise, the by-pass 5 is disposed in parallel with the catalytic converter 3, and its upper- and lower-course ends 5a and 5b are connected to the upper- and lower-course ends 3a and 3b of the converter 3, respectively.

The control valve unit 6 is a proportional control valve, which is composed of a valve disk 12, an actuator 14, and a rod 13 coupling the disk 12 and the actuator 14. The valve disk 12 is situated at the diverging point of the by-pass 4, that is, the junction of the respective upper-course ends 2a and 4a of the catalytic converter 2 and the by-pass 4. Thus, the disk 12 can close the upper-course end 2a or 4a, or allow both these ends to open suitably.

The actuator 14 is formed of a DC motor 14a, which is driven by a driver circuit 10a of the ECU 10, thereby controlling the valve disk 12. The control valve unit 7, like the control valve unit 6, is composed of a valve disk 15, an actuator 17, and a rod 16 coupling the disk 15 and the actuator 17. The valve disk 15 is situated at the diverging point of the by-pass 5, that is, the junction of the respective upper-course ends 3a and 5a of the catalytic converter 3 and the by-pass 5. Thus, the disk 15 can close the upper-course end 3a or 5a, or allow both these ends to open suitably.

The rods 13 and 16 and their corresponding actuators 14 and 17 are connected to one another by means of conventional rack-and-pinion mechanisms or screw-transmission mechanisms. Rotations of the DC motor 14a of the actuator 14 and a motor (not shown) of the actuator 17 are converted into linear motions of the rods 13 and 16, respectively.

The temperature sensors 8 and 9 are arranged in the catalytic converters 2 and 3, respectively, and their respective connecting wires are connected to the ECU 10. These temperature sensors 8 and 9 detect the catalyst-bed temperatures of the converters 2 and 3, respectively, and delivers corresponding temperature signals to the ECU 10, which is composed of a microcomputer.

The ECU 10 is used for feedback control of the respective temperatures of the catalytic converters 2 and 3. More specifically, the ECU 10 calculates the deviation between a reference value and a temperature signal from the temperature sensor 8, and delivers a corresponding control signal to the actuator 14 of the control valve unit 6. In accordance with the deviation, the ECU 10 drives the actuator 14 to regulate the position of the valve disk 12, thereby controlling a flow of exhaust gas into the catalytic converter 2, that is, a by-pass flow of the exhaust gas into the by-pass 4.

Figure 2:
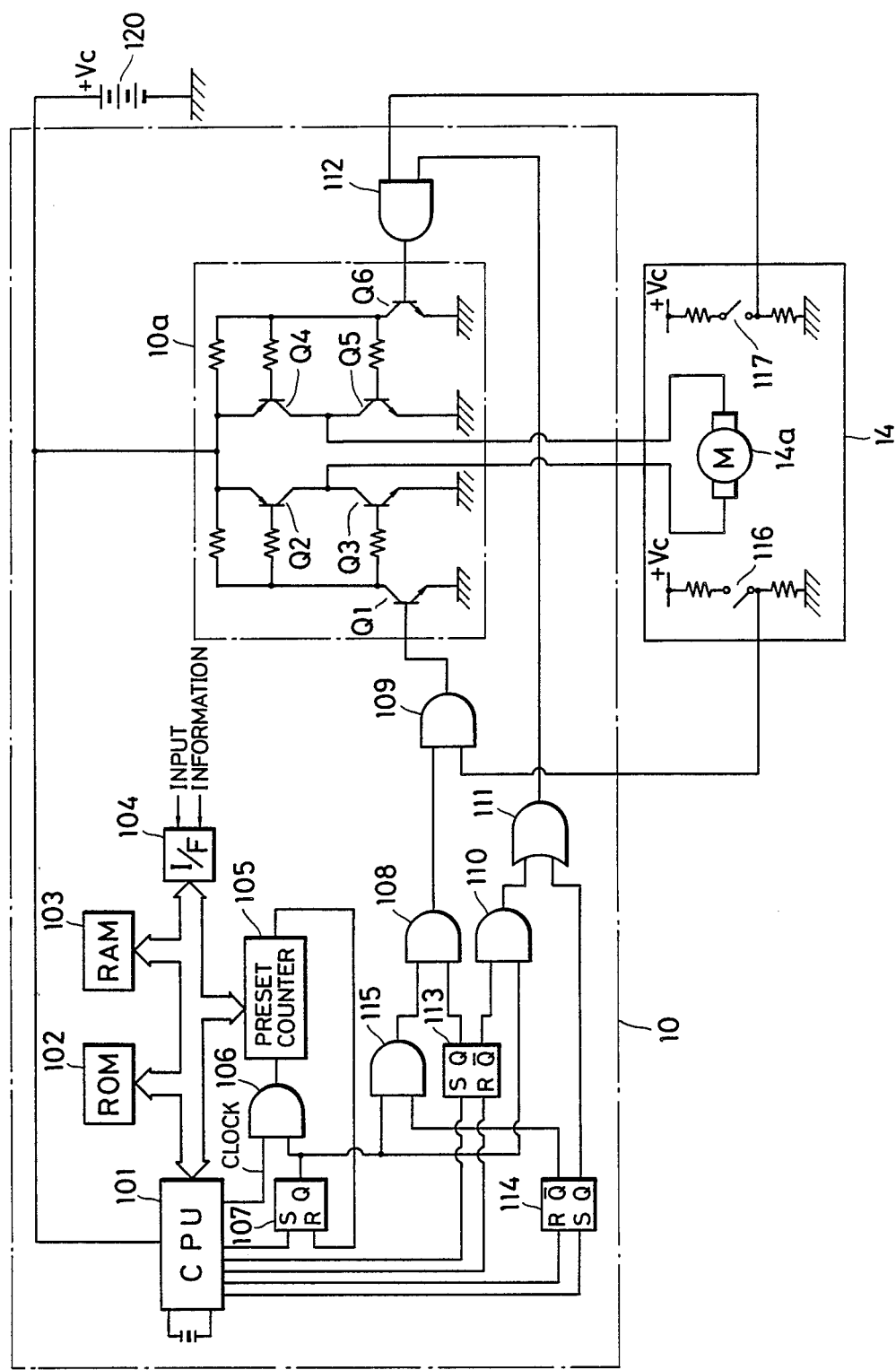
FIG. 2 is a circuit diagram schematically showing configurations of a control unit 10 and a driver circuit 10a shown in FIG. 1.

Meanwhile, the ECU 10 and the driver circuit 10a, which drives the actuator 14 in response to a signal from the ECU 10, are constructed as shown in FIG. 2. The ECU 10 includes a CPU 101, ROM 102, RAM 103, interface (I/F) 104, and preset counter 105. A calculation result from the CPU 101 is applied to the counter 105. The interface 104 is adapted to receive information on various operating conditions of the engine. This input information includes detection values of the temperature sensors 8 and 9.

The preset counter 105 is a down counter in which preset data are counted down by means of clock pulses. The counter 105 delivers a low-level signal at all times except when it generates a pulsating high-level signal the moment the stored data becomes zero.

The clock pulses are supplied to the counter 105 through an AND gate 106. The operation of the AND gate 106 is controlled in accordance with a noninverted output (Q-terminal output) of a flip-flop 107. Output signals from the CPU 101 and the counter 105 are applied to a set terminal S and a reset terminal R, respectively, of the flip-flop 107. The noninverted output of the flip-flop 107 goes high only during a time interval between the supply of a set signal from the CPU 101 and the instant that data in the counter 105 becomes zero. The high-level output signal of the flip-flop 107 applied to the AND gate 106, and is also supplied to the base of a transistor Q1 of the driver circuit 10a via three AND gates 115, 108 and 109. The output of the flip-flop 107 is applied to the base of a transistor Q6 of the driver circuit 10a through an AND gate 110, an OR gate 111, and an AND gate 112.

The AND gates 108 and 110 are supplied with a noninverted output (Q-terminal output) and an inverted output ($\overline{Q}$-terminal output), respectively, from the flip-flop 113. Only one of the AND gates 108 and 110 is opened in response to a set or reset signal which is supplied from the CPU 101 to the flip-flop 113. The OR gate 111 is supplied with a noninverted output from a flip-flop 114, which receives set and reset inputs from the CPU 101. An inverted output from the flip-flop 114 is applied to the AND gate 115.

Moreover, the AND gates 109 and 112 are supplied with detection results from limit switches 116 and 117 of the actuator 14, respectively. The limit switch 116 is adapted to be turned off when the by-pass 4 is fully closed by the valve disk 12 of the control valve unit 6. In this state, a low-level signal is delivered to the AND gate 109. When the disk 12 is situated on the opening side of its fully closing position, the switch 116 is turned on, so that a high-level signal is delivered to the AND gate 109. On the other hand, the limit switch 117 is turned off when the valve disk 12 allows the by-pass 4 to open fully. In this state, a low-level signal is delivered to the AND gate 112. When the disk 12 is situated on the closing side of its fully opening position, the switch 117 is turned on, so that a high-level signal is delivered to the AND gate 112.

The driver circuit 10a of the actuator 14 is provided with four additional transistors Q2, Q3, Q4 and Q5, besides the aforesaid transistors Q1 and Q6. If a high-level signal is applied to the base of the transistor Q1 when the base of the transistor Q6 is at low level, a current from a battery 120 flows through the transistor Q2, the DC motor 14a of the actuator 14, and the transistor Q5. Thereupon, the DC motor 14a rotates in the forward direction, thereby driving the valve disk 12 in a direction such that the by-pass 4 is closed by the disk 12. If a high-level signal is applied to the base of the transistor Q6 when the base of the transistor Q1 is at low level, on the other hand, the current from the battery 120 flow through the transistor Q4, the DC motor 14a of the actuator 14, and the transistor Q3. As a result, the DC motor 14a rotates in the reverse direction, thereby driving the valve disk 12 in a direction such that the disk 12 allows the by-pass 4 to open. After the high-level drive signal disappears, the valve disk 12 maintains its valve-opening position at the point of time of the signal's disappearance.

Referring now to the flow chart of FIG. 3, processes of opening control for the control valve unit 6, by the ECU 10, will be described.

First, a catalyst-bed temperature Tr of the catalytic converter 2, which is detected by the temperature sensor 8, is inputted in Step S1. Then, whether or not the temperature Tr is not lower than an unusually high temperature (e.g., 900° C.) is determined in Step S2. If an unusually high temperature is detected in Step S2, a set signal is delivered to the flip-flop (FF) 114 in Step S3. Then, in Step S4, an initial value (e.g., data corresponding to a predetermined value TA1 from 1 to 5 seconds) is applied to a timer address TA of the RAM 103. Thereafter, Step S1 is resumed, whereupon the program restarts to be executed.

If no unusually high temperature is detected in Step S2, on the other hand, a reset signal is delivered to the flip-flop 114 in Step S5. Then, whether the data of the timer address TA is zero or not is determined in Step S6. If TA=0 is detected, a temperature deviation $\Delta T$ (=Ts−Tr) between a reference temperature Ts (e.g., 700° C.), as a target value, and the actual catalyst-bed temperature Tr is calculated in Step S7. Then, whether the absolute value of the temperature deviation $\Delta T$ is small or not is determined in Step S8. If the absolute value is judged to be small, that is, if the deviation of the actual catalyst-bed temperature Tr from the reference temperature Ts is within a temperature range of $\pm\alpha°$ C. or dead zone, the aforesaid initial value is applied to the timer address TA in Step S4. Thereafter, Step S1 is resumed.

If it is concluded that the absolute value of the temperature deviation $\Delta T$ is large, that is, if the difference between the catalyst-bed temperature Tr and the reference temperature Ts is found to be outside the dead zone $\pm\alpha°$ C., in Step S8, whether the deviation $\Delta T$ is positive or negative is determined in Step S9. If $\Delta T>0$ is detected, a reset signal is delivered to the flip-flop 113, so that the AND gates 108 and 110 are closed and opened, respectively. If $\Delta T\leqq 0$ is detected, a set signal is delivered to the flip-flop 113, so that the AND gates 108 and 110 are opened and closed, respectively. Then, a valve drive time data D of the DC motor 14a corresponding to the temperature deviation $\Delta T$ is read out from the ROM 102 and set in Step S12, and is delivered to the preset counter 105 in Step S13. Further, a set signal is delivered to the flip-flop 107 in Step S14, whereupon the Step S4 is reached.

Figure 3:
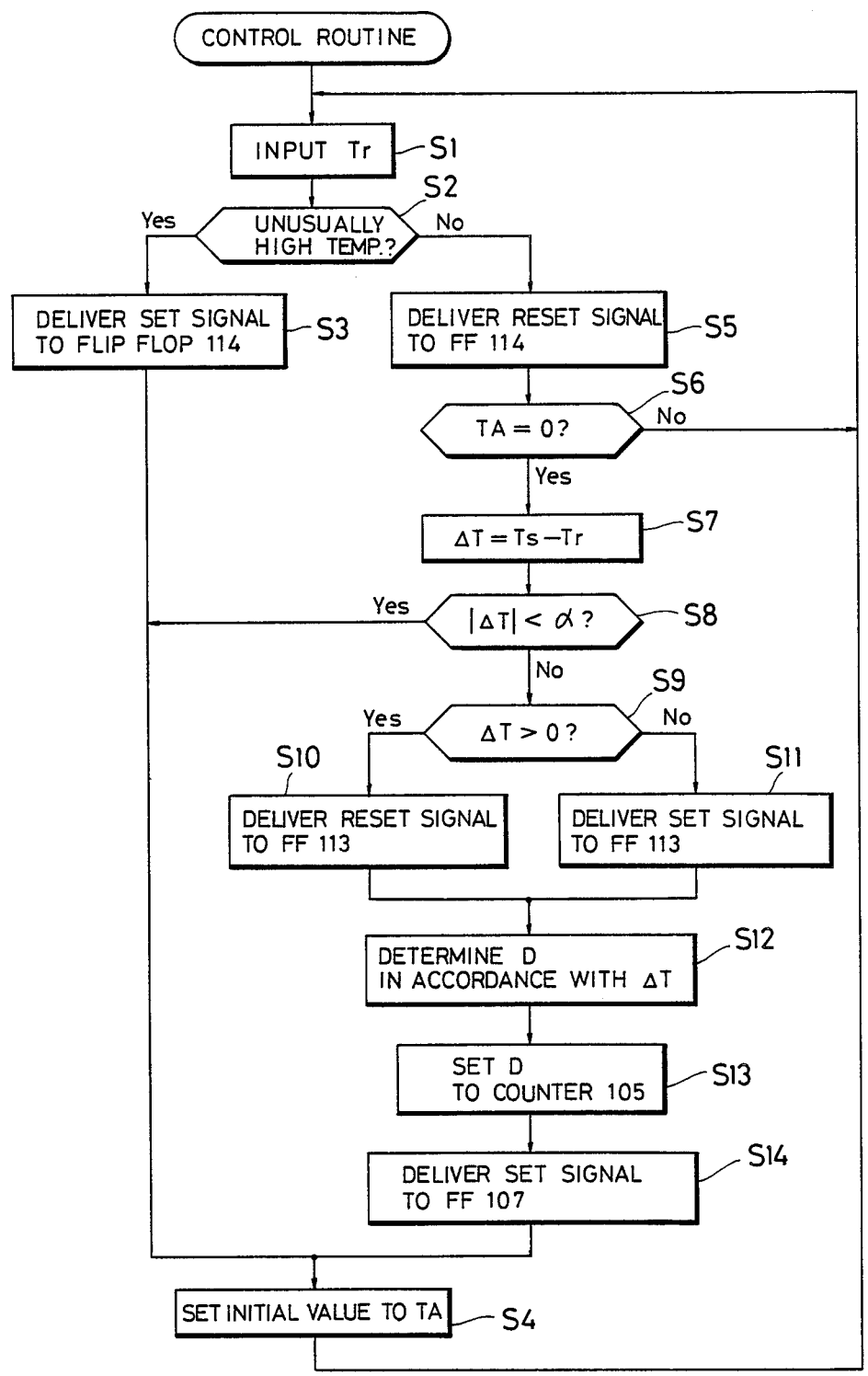
FIG. 3 is a flow chart showing processes of controlling the valve opening of a control valve unit 6 executed by a CPU 101 of the control unit 10 shown in FIG. 2.
Figure 4:
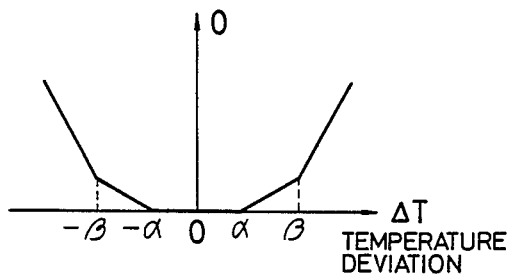
FIG. 4 is a graph showing the relation between a temperature deviation value ΔT and a valve drive time data D of the control valve unit 6 shown in FIG. 1.
Figure 5:
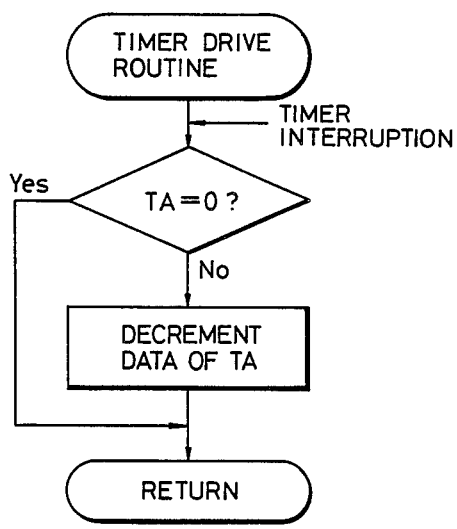
FIG. 5 is a flow chart for a timer interruption drive routine of a timer address TA shown in Step S4 of FIG. 3 and executed by the CPU 101.

Meanwhile, FIG. 4 shows the relation between the temperature deviation $\Delta T$ and the drive time data D obtained in Step S12. After the absolute value of the deviation $\Delta T$ exceeds the dead zone $\alpha$, the value of the drive time data D tends to become larger with increase of the absolute deviation value $\Delta T$. When the absolute value exceeds a set value $\beta(\beta>\alpha 0)$, in particular, the increment of the value of the data D increases. The value of the data in the time address TA decreases continually before TA=0 is obtained through execution of a timer drive routine of FIG. 5. Accordingly, the time elapsed after the latest input of the initial value TA1, in Step S4 of the flow chart of FIG. 3, can be measured.

Thus, in the control procedure based on the flow chart of FIG. 3, if the catalyst-bed temperature of the catalytic converter 2 is unusually high, the noninverted output of the flip-flop 114 is applied to the base of the transistor Q6 through the OR gate 111 and AND gate 112, and the actuator 14 is driven until the by-pass 4 is opened fully. If the converter 2 is not at an unusually high temperature, on the other hand, a high-level pulse, having a duration corresponding to the temperature deviation $\Delta T$ between the catalyst-bed temperature Tr and the reference value Ts, appears at the noninverted output of the flip-flop 107, with every passage of the aforesaid predetermined time TA1. This high-level noninverted output is delivered to the transistor Q6 where $\Delta T > 0$, and to the transistor Q1 where $\Delta T < 0$. Thus, the valve opening of the control valve unit 6 is adjusted in accordance with the temperature deviation $\Delta T$ with every predetermined time TA1, in order that the temperature of the catalytic converter 2 is controlled within a range defined by valves $Ts \pm \alpha$.

The valve opening of the control valve unit 7 is also controlled by means of a control signal supplied from the ECU 10 to the actuator 17. Only when the temperature of the catalytic converter 3 rises to an unusual level, the valve unit 7, which normally closes the by-pass 5, is driven by the actuator 17 in a direction such that the by-pass 5 is allowed to open. Thus, the by-pass 5 opens fully.

If the temperatures of the catalytic converters 2 and 3 are much lower than the aforesaid reference temperature, as at the start of the engine 20, the ECU 10 causes the control valve units 6 and 7 to close the respective open ends 4a and 5a of the by-passes 4 and 5, thereby connecting the two converters 2 and 3 in series. Thus, all the exhaust gas from the engine 20 is introduced into the converters 2 and 3. As the exhaust gas is fed in this manner, the respective temperatures of the converters 2 and 3 increase. In the catalytic converter 2, which is situated closer to the engine 20, the temperature of the introduced exhaust gas is high. Accordingly, the warm-up performance is improved, thereby permitting faster purification of the exhaust gas after the start of the engine 20.

As the temperature of the catalytic converter 2 rises, the deviation between the temperature value Tr detected by the temperature sensor 8 and the reference value Ts becomes smaller. Finally, the temperature Tr reaches the reference temperature Ts. If the temperature Tr of the catalytic converter 2 exceeds the value which is $\alpha°$ C. higher than the reference temperature Ts (700° C.), the ECU 10 starts to control the control valve unit 6. Thereupon, the DC motor 14a is caused to control the valve opening of the valve unit 6 in a throttling manner, in accordance with the deviation $\Delta T$ between the temperature Tr detected by the temperature sensor 8 and the reference temperature Ts. Thus, the exhaust gas introduced into the catalytic converter 2 is reduced, thereby restraining the temperature of the converter 2 from increasing.

If the temperature Tr of the catalytic converter 2 falls below the value which is $\alpha°$ C. lower than the reference temperature Ts (700° C.), as a result of the reduction of the exhaust gas introduced into the converter 2, the DC motor 14a is caused to drive the control valve unit 6 in a direction such that the amount of gas flow into the converter 2 increases, or that the by-pass 4 is closed. In this manner, the temperature of the catalytic converter 2 is increased.

Thus, the catalyst-bed temperature of the catalytic converter 2, which is situated closer to the engine, rises up quickly to the reference temperature (700° C.) after the cold start of the engine, so that the converter 2 is activated for the purification of the exhaust gas. Thereafter, the temperature of the converter 2 is kept in the vicinity of the reference temperature at which the purifying efficiency is the highest.

When the catalytic converter 2 is kept at the reference temperature, the control valve unit 6 normally has its opening intermediate between those for its fully-opening and fully-closing positions. In this state, some of the exhaust gas from the engine 20 is purified by passing through the catalytic converter 2, while the remainder is introduced through the by-pass 4 into the catalytic converter 3, to be purified therein.

If abnormal combustion or any other trouble occurs in the catalytic converter 2, thereby increasing the catalyst-bed temperature therein to an unusually high level (e.g., 900° C.), the control valve unit 6 closes the passage to the converter 2, so that all the exhaust gas is introduced through the by-pass 4 into the catalytic converter 3. As a result, the catalytic converter 2 ceases to function, so that the temperature therein lowers quickly, thereby protecting the converter 2 against fusion or the like.

Even if all the exhaust gas is fed directly into the catalytic converter 3 through the by-pass 4, the converter 3, which is situated farther from the engine 20, normally cannot be heated to an unusually high temperature (900° C.). Normally, therefore, the by-pass 5 is closed by the control valve unit 7. In case of an unusually high temperature in the catalytic converter 3, however, the valve unit 7 allows the by-pass 5 quickly to open fully, thereby lowering the temperature of the converter 3 to protect it against fusion or other trouble.

After the start of the engine 20, according to the embodiment described above, all the exhaust gas is introduced into the catalytic converter 2, which is situated closer to the engine, so that the catalyst-bed temperature of the converter 2 rises quickly. Thus, the purification of the exhaust gas can be started immediately after the engine start. After the catalytic converter 2 reaches the reference temperature for the maximum purifying capability, most of the exhaust gas is purified with the converter 2 kept at the reference temperature, while the remainder, flowing through the by-pass 4, is purified in the catalytic converter 3. Thus, the exhaust purifying capability can be improved considerably.

An engine running test on the purifying capability was conducted, on the basis of the LA4 mode of U.S. FTP, by the inventor hereof, using a three-way catalyst for the catalytic converters 2 and 3. The apparatus of the present invention produced very satisfactory results; the CO, HC, and NOx contents, by weight, of exhaust gas for each mile were 1.5, 0.2, and 0.2 g/mile, respectively. Using a conventional apparatus similar to the one shown in FIG. 1, on the other hand, the catalyst-bed temperature of a catalytic converter corresponding to the catalytic converter 2 was compared with a reference temperature. When the catalyst-bed temperature was higher than the reference temperature, the control valve unit was controlled so as to allow the by-pass to open fully. In contrast with this, the by-pass was closed fully, when the catalyst-bed temperature was lower. In other words, the valve unit was subjected to on-off control, based on the catalyst-bed temperature, as in the case of U.S. Pat. No. 3,851,469 mentioned before. In this case, the figures indicative of the purifying capability proved poorer; 2.5 g/mile for CO, 0.3 g/mile for HC, and 0.3 g/mile for NOx. This also indicates that a satisfactory effect of purification can be obtained if the valve opening of the control valve unit 6 is changed gradually according to the catalyst-bed temperature, as in the apparatus of the present embodiment.

In controlling the valve opening of the control valve unit 6 in accordance with the temperature deviation, in the embodiment described above, the valve opening is changed at predetermined time intervals TA1 set suitably, so that overcontrol or hunting, during the feedback control of temperature, can be prevented.

Figure 6:
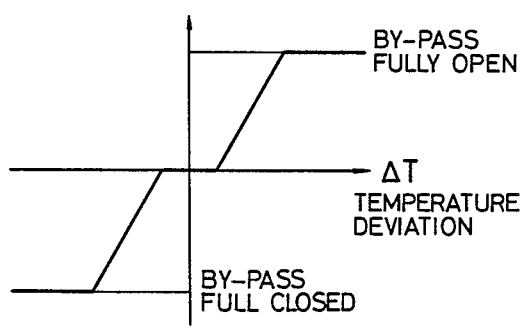
FIG. 6 is a graph showing the relation between the temperature deviation value ΔT and the valve opening of the control valve unit 6 shown in FIG. 1, in alternative opening control processes for the valve unit 6.

According to the aforementioned embodiment, moreover, the variation of the opening of the control valve unit 6 is set in accordance with the temperature deviation. Alternatively, however, the opening itself of the valve unit 6 may be set on the basis of the temperature deviation, as shown in FIG. 6.

In the above embodiment, furthermore, the catalytic converter 3, which is situated farther from the engine 20, is provided with the by-pass 5, and the control valve unit 7 is located at an upper-course junction of the by-pass 5. Alternatively, however, the by-pass 5 and the valve unit 7 may be omitted. In this case, all the exhaust gas that passes through the catalytic converter 2 or the by-pass 4 normally flows through the catalytic converter 3 on the lower-course side. Basically, however, the converter on the lower-course side can be prevented from being heated to an unusually high temperature, by being situated suitably in a position remote from the engine.

According to the embodiment described above, moreover, the catalytic converters used are only two in number. Alternatively, however, a third catalytic converter may be provided in that portion of the exhaust passage which is situated on the lower-course side of the lower-course junction of the by-pass 5 and the passage for the converter 3, and on the upper-course side of the muffler 21. In this case, the control valve unit 7, adapted for the opening adjustment of the by-pass 5 and the passage for the converter 3, is preferably controlled in the same manner as the control valve unit 6, using temperature information on the converter 3 as an input element. With this arrangement, the purification of the exhaust gas can be expected to be accelerated by controlling the opening of the control valve unit 7 so that the catalyst-bed temperature of the catalytic converter 3 equals the reference temperature (e.g., 700° C.) set therefor.

In the aforementioned embodiment, furthermore, a DC motor is used as the actuator of the control valve. It is to be understood, however, that the present invention is not limited to such an arrangement, and that the DC motor may be replaced with any other suitable means for the purpose, such as a linear solenoid, stepper motor, vacuum-controlled diaphragm, etc.

In connection with the above embodiment, moreover, the catalyst-bed temperature of each catalytic converter has been described as being detected in a direct manner. Alternatively, however, the bed temperature may be obtained, for example, by detecting the ambient temperature of the converter or the temperature just on the lower-course side of the converter, which is associated with the bed temperature.

In the embodiment described herein, furthermore, the control valve units 6 and 7 are located individually at the upper-course junctions of their corresponding by-passes and the passages for the catalytic converters. Alternatively, however, the valve units may be disposed at the lower-course junctions of the by-passes and the passages, or in the middle of their corresponding passages.

What is claimed is:

1. A temperature control apparatus for at least two catalytic converters connected in series in a exhaust passage of an internal combustion engine mounted on a vehicle, a first of said at least two catalytic converters being connected in the vicinity of said engine, and a second of said at least two catalytic converters being connected farther from said engine than said first catalytic converter, the control apparatus comprising:

a by-pass connected in parallel with said first catalytic converter;

a control valve for substantially continuously and variably controlling the ratio between the amounts of exhaust gas introduced from said engine into said first catalytic converter and into said by-pass;

valve drive means for driving said control valve in a substantially continuous manner;

temperature detecting means for detecting a temperature value associated with the catalyst-bed temperature of said first catalytic converter; and control means for calculating a deviation between a reference value and the temperature value detected by said temperature detecting means, and for delivering a drive signal to said valve drive means in accordance with said deviation, thereby controlling the opening of said control valve to keep said temperature value associated with said catalyst-bed temperature of said first catalytic converter in the vicinity of said reference value.

2. A temperature control apparatus according to claim 1, wherein said control means delivers a drive signal to said valve drive means when said temperature value, detected by said temperature detecting means, exceeds a predetermined allowable temperature value greater than said reference value, said drive signal serving to drive said control valve to an open position such that the amount of exhaust gas introduced into said first catalyst converter is substantially zero.

3. A temperature control apparatus according to claim 1, wherein said control means includes means for rendering said valve drive means nonoperating, thereby maintaining the opening of said control valve, when the absolute value of said deviation is not greater than a predetermined value.

4. A temperature control apparatus according to claim 1, wherein said control valve is disposed at a junction of said first catalytic converter and said by-pass at the upstream side of said first catalytic converter.

5. A temperature control apparatus according to claim 1, wherein each said catalytic converter is a three-way catalytic converter.

6. A temperature control apparatus according to claim 1, wherein each said catalytic converter is an oxidizing catalytic converter.

7. A temperature control apparatus according to claim 1, which further comprises a second by-pass connected in parallel with said second catalytic converter, which is located downstream of said first catalytic converter, a second control valve for controlling the ratio between the amount of exhaust gas introduced into aid second catalytic converter and said second by-pass, second valve drive means for driving said second control valve, and second temperature detecting means for detecting a temperature value associated with the catalyst-bed temperature of said second catalytic converter; and wherein said control means includes means for delivering a drive signal to said second valve drive means when the temperature value, detected by said second temperature detecting means, exceeds a predetermined allowable temperature value of said second catalytic converter, said drive signal serving to drive said second control valve to an opening position thereof such that the amount of exhaust gas introduced into said second catalytic converter is substantially zero.

8. A temperature control apparatus according to claim 7, wherein said control means includes means for calculating a deviation between a reference value set for said second catalytic converter and the temperature value detected by said second temperature detecting means, and means for delivering a drive signal to said second valve drive means in accordance with said deviation, thereby controlling the opening of said second control valve.

9. A temperature control apparatus according to claim 1, wherein said control valve is driven by said valve drive means between open and closed states in a substantially continuously variable manner.

* * * * *

UNITED STATES PATENT AND TRADEMARK OFFICE
CERTIFICATE OF CORRECTION

PATENT NO.   : 4,817,385

DATED        : April 4, 1989

INVENTOR(S)  : S. KUMAGAI

It is certified that error appears in the above-identified patent and that said Letters Patent is hereby corrected as shown below:

In the title page, the priority number should be changed from "61-10797" to --61-107970--.

Signed and Sealed this

Twentieth Day of February, 1990

Attest:

JEFFREY M. SAMUELS

Attesting Officer     Acting Commissioner of Patents and Trademarks